(12) United States Patent
Nakanishi et al.

(10) Patent No.: US 8,597,583 B2
(45) Date of Patent: Dec. 3, 2013

(54) AMMONIA SYNTHESIS APPARATUS AND PROCESS

(75) Inventors: Haruyuki Nakanishi, Susono (JP); Norihiko Nakamura, Mishima (JP); Hidekazu Arikawa, Susono (JP); Susumu Hikazudani, Takatsuki (JP); Sadao Araki, Sakai (JP); Chikashi Inazumi, Kyoto (JP)

(73) Assignees: Toyota Jidosha Kabushiki Kaisha, Toyota (JP); Hitachi Zosen Corporation, Osaka (JP)

( * ) Notice: Subject to any disclaimer, the term of this patent is extended or adjusted under 35 U.S.C. 154(b) by 966 days.

(21) Appl. No.: 12/705,056

(22) Filed: Feb. 12, 2010

(65) Prior Publication Data
US 2010/0260655 A1   Oct. 14, 2010

(30) Foreign Application Priority Data

Apr. 8, 2009   (JP) ................. 2009-094090

(51) Int. Cl.
*C01C 1/00* (2006.01)
*B01J 19/00* (2006.01)
*B01J 8/00* (2006.01)
*C01B 21/00* (2006.01)
*C01C 1/04* (2006.01)

(52) U.S. Cl.
USPC ........... 422/148; 422/129; 422/187; 423/351; 423/352; 423/359

(58) Field of Classification Search
USPC .......... 422/129, 148, 187; 423/351, 352, 359; 502/20, 34, 38
See application file for complete search history.

(56) References Cited

U.S. PATENT DOCUMENTS

| 6,620,398 | B2 * | 9/2003 | Kindig et al. | 423/359 |
| 7,033,570 | B2 * | 4/2006 | Weimer et al. | 423/650 |
| 2006/0013759 | A1 * | 1/2006 | Jiang et al. | 423/648.1 |

FOREIGN PATENT DOCUMENTS

| JP | A 11-322301 | 11/1999 |
| JP | A 2007-112672 | 5/2007 |
| JP | 2008062188 A * | 3/2008 |

OTHER PUBLICATIONS

Machine translation of JP 2008-062188A, which was published on Mar. 21, 2008.*
Kodama et al., "Thermochemical Cycles for High-Temperature Solar Hydrogen Production," Chemical Reviews, vol. 107, pp. 4048-4077.

* cited by examiner

*Primary Examiner* — Prem C Singh
*Assistant Examiner* — Natasha Young
(74) *Attorney, Agent, or Firm* — Oliff & Berridge, PLC

(57) ABSTRACT

An ammonia synthesis apparatus includes: a first gas channel; a second gas channel disposed outside the first gas channel; a third gas channel disposed outside the second gas channel; an air supply unit that supplies air to the second or third gas channel; a water supply unit that supplies water to the first gas channel; and a heat supply unit that supplies heat to the first gas channel. A metal or a metal oxide that reduces water to produce hydrogen is placed in the first gas channel. An ammonia synthesis catalyst is placed in the second gas channel located downstream of the downstream end portion of the first gas channel. The second and third gas channels are at least partially partitioned by an oxygen permeation membrane, or a nitrogen permeation membrane, so that oxygen is supplied to the third gas channel, and nitrogen is supplied to the second gas channel.

8 Claims, 3 Drawing Sheets

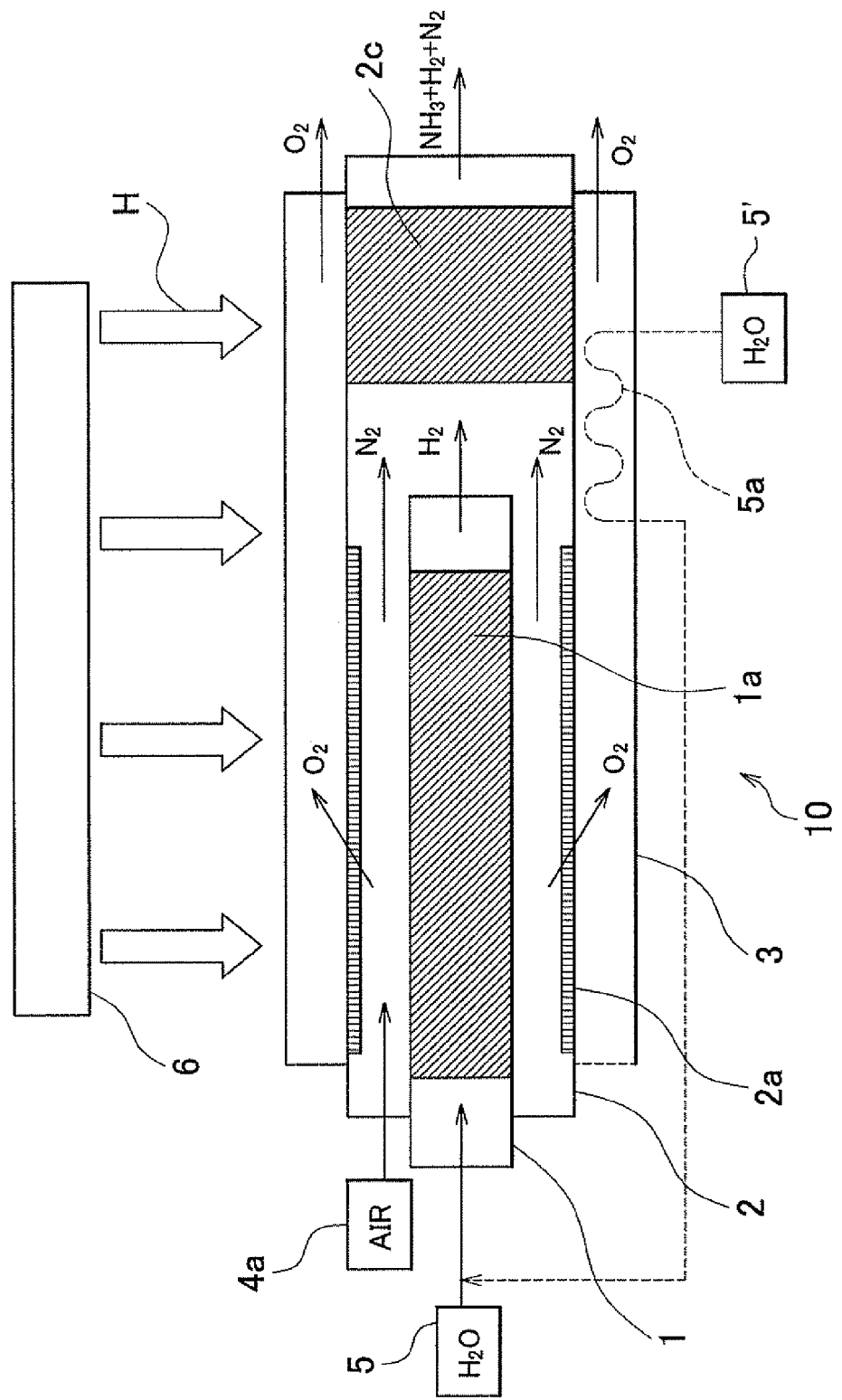

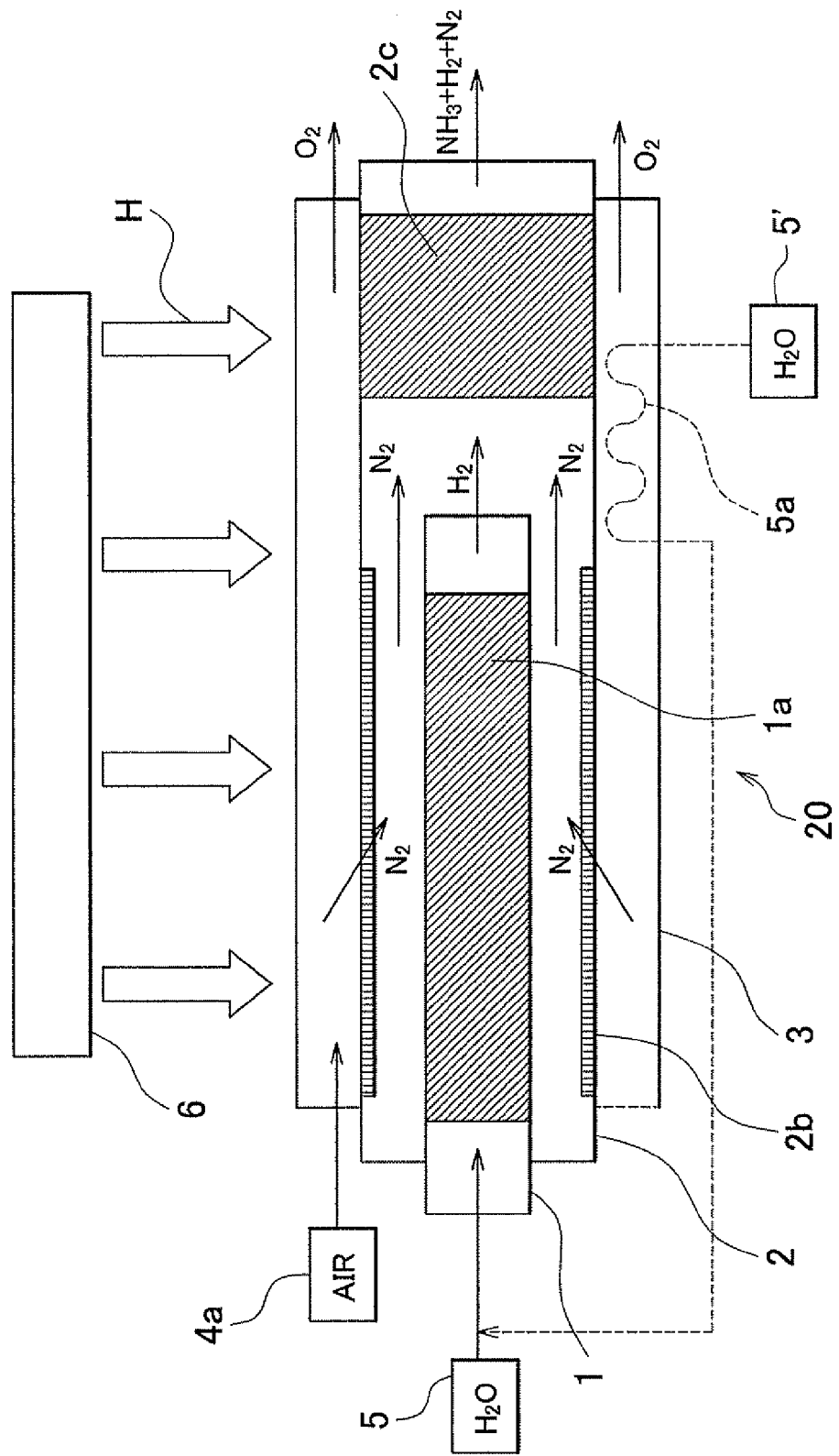

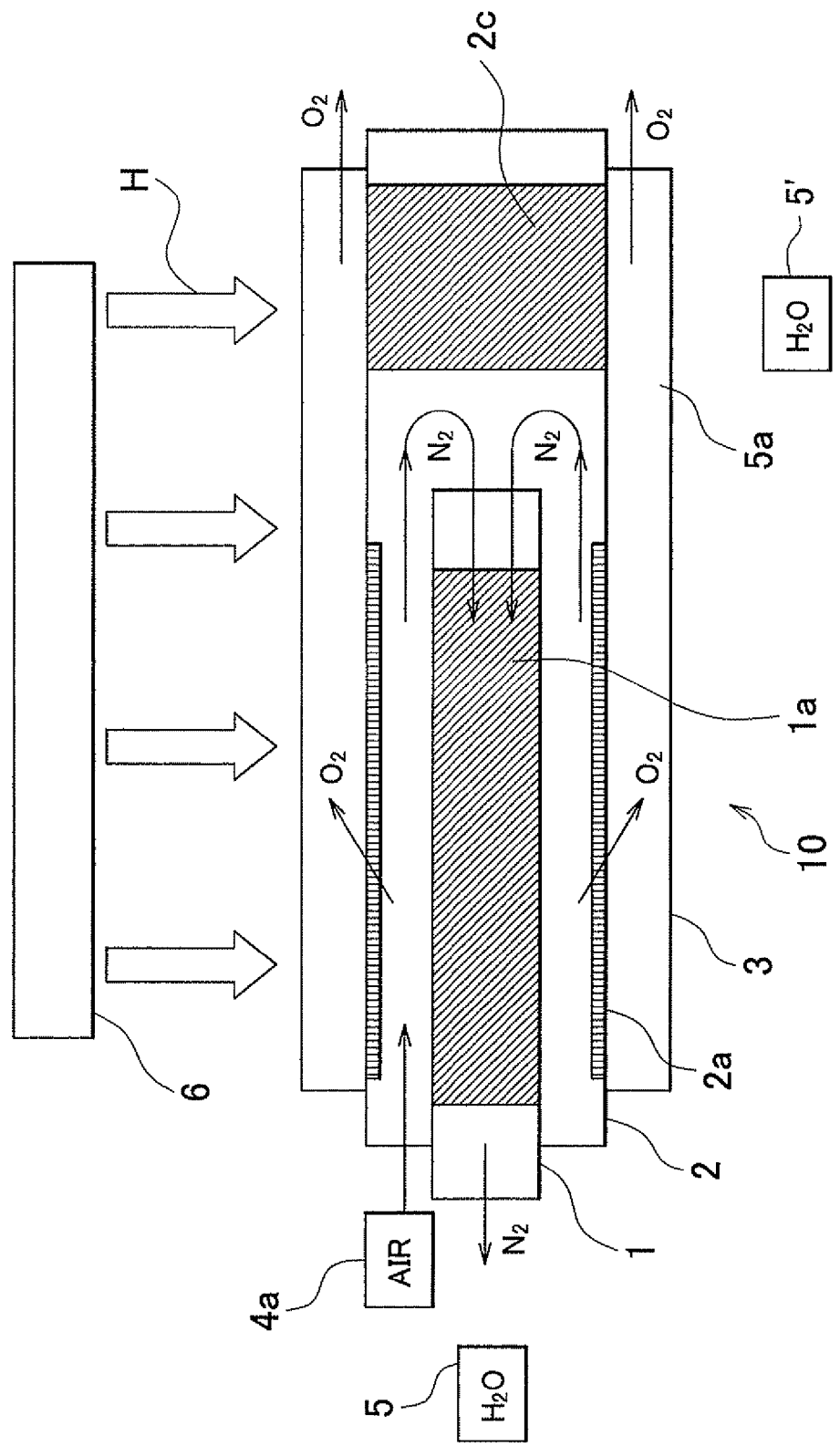

AMMONIA SYNTHESIS APPARATUS AND PROCESS

INCORPORATION BY REFERENCE

The disclosure of Japanese Patent Application No. 2009-94090 filed on Apr. 8, 2009 including the specification, drawings and abstract is incorporated herein by reference in its entirety.

BACKGROUND OF THE INVENTION

1. Field of the Invention

The invention relates to ammonia synthesis apparatus and process for synthesizing ammonia from water and air.

2. Description of the Related Art

About one hundred years ago, German chemists, Fritz Haber and Carl Bosch, developed a chemical process for the synthesis of ammonia and succeeded in mass production of ammonia for the first time. The Haber-Bosch process, which is represented by a reaction as follows: $N_2+3H_2 \rightarrow 3NH_3$ (about 400° C.), is advantageous in its easiness and relatively high efficiency, and is still used now without being basically changed.

Hydrogen used for the synthesis of ammonia is obtained from natural gas containing methane ($CH_4$) as a main component. It has also been proposed to obtain hydrogen for the synthesis of ammonia, through electrolysis of water. Furthermore, it has been contemplated to react metal or metal oxide with water, for production of hydrogen, as described in Japanese Patent Application Publication No. 2007-112672 (JP-A-2007-112672), Japanese Patent Application Publication No. 11-322301 (JP-A-11-322301), and Kodama, T., Gokon, N., 2007, "Thermochemical Cycles for High-Temperature Solar Hydrogen Production", Chemical Reviews, 107, 4048-4077.

SUMMARY OF THE INVENTION

The invention provides ammonia synthesis apparatus and process for effectively synthesizing ammonia from water and air, by incorporating reaction between metal or metal oxide and water for hydrogen production, into the synthesis of ammonia.

A first aspect of the invention is concerned with an ammonia synthesis apparatus. The ammonia synthesis apparatus includes: a first gas channel; a second gas channel disposed outside the first gas channel; a third gas channel disposed outside the second gas channel; an air supply unit that supplies air to the second or third gas channel; a water supply unit that supplies water to the first gas channel; and a heat supply unit that supplies heat to the first gas channel. A metal or a metal oxide that reduces water so as to produce hydrogen is placed in the first gas channel. A downstream end portion of the second gas channel is located downstream of a downstream end portion of the first gas channel. An ammonia synthesis catalyst for synthesizing ammonia from hydrogen and nitrogen is placed in a portion of the second gas channel which is located downstream of the downstream end portion of the first gas channel. The second gas channel and the third gas channel are at least partially partitioned by an oxygen permeation membrane that selectively allows oxygen to permeate therethrough, or a nitrogen permeation membrane that selectively allows nitrogen to permeate therethrough, so that oxygen is supplied to the third gas channel, and nitrogen is supplied to the second gas channel.

A second aspect of the invention is concerned with a process for synthesizing ammonia, using the apparatus according to the first aspect of the invention. The process for synthesizing ammonia includes the steps of: supplying water from the water supply unit to the first gas channel; producing hydrogen by reacting the water with the metal or metal oxide so as to reduce the water; supplying air from the air supply unit to the second or third gas channel; supplying oxygen to the third gas channel and supplying nitrogen to the second gas channel, by means of the oxygen permeation membrane or the nitrogen permeation membrane; and synthesizing ammonia by supplying hydrogen produced in the first gas channel and nitrogen supplied to the second gas channel to the ammonia synthesis catalyst.

A third aspect of the invention is concerned with a process for reconditioning the apparatus according to the first aspect of the invention. The reconditioning process includes the steps of: stopping supply of water from the water supply unit to the first gas channel, supplying air from the air supply unit to the second or third gas channel, supplying oxygen to the third gas channel and supplying nitrogen to the second gas channel, by means of the oxygen permeation membrane or the nitrogen permeation membrane, and preventing nitrogen supplied to the second gas channel from being discharged from an outlet of the second gas channel so that the nitrogen supplied to the second gas channel flows through the first gas channel in the reverse direction, and supplying heat from the heat supply unit to the first gas channel, so as to renew the metal or metal oxide that has reacted with water.

A fourth aspect of the invention is concerned with an ammonia synthesis apparatus. The ammonia synthesis apparatus includes an air supply unit, a water supply unit, a hydrogen producing unit that supplies water to a metal or a metal oxide so as to reduce the water and produce hydrogen, a nitrogen supply unit that supplies nitrogen from air supplied from the air supply unit, and an ammonia synthesizing unit that causes reaction between hydrogen produced by the hydrogen producing unit and nitrogen supplied from the nitrogen supply unit, so as to synthesize ammonia.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 is a view showing an ammonia synthesis apparatus according to a first embodiment of the invention;

FIG. 2 is a view showing an ammonia synthesis apparatus according to a second embodiment of the invention; and FIG. 3 is a view useful for explaining a process for reconditioning the ammonia synthesis apparatus according to the first embodiment of the invention as shown in FIG. 1.

DETAILED DESCRIPTION OF EMBODIMENTS

An ammonia synthesis apparatus 10 according to a first embodiment of the invention as shown in FIG. 1 includes a first gas channel 1, a second gas channel 2 concentrically disposed outside the first gas channel 1 so as to surround the first gas channel 1, and a third gas channel 3 concentrically disposed outside the second gas channel 2 so as to surround the second gas channel 2. The ammonia synthesis apparatus 10 further includes an air supply unit 4a that supplies air to the second gas channel 2, a water supply unit 5 that supplies water to the first gas channel 1, and a heat supply unit 6 that supplies heat to the first, second and third gas channels 1-3.

A metal or metal oxide 1a is placed in the first gas channel 1, and an ammonia synthesis catalyst 2c is placed in the second gas channel 2.

The second gas channel 2 and the third gas channel 3 are partially partitioned by an oxygen permeation membrane 2a that selectively allows oxygen to permeate therethrough. With this arrangement, oxygen contained in the air supplied to the second gas channel 2 permeates through the oxygen permeation membrane 2a, to be supplied to the third gas channel 3, and nitrogen contained in the air supplied to the second gas channel 2 is supplied to the second gas channel 2 without permeating through the oxygen permeation membrane 2a.

An ammonia synthesis apparatus 20 according to a second embodiment of the invention as shown in FIG. 2 is substantially identical with the ammonia synthesis apparatus 10 according to the first embodiment of the invention as shown in FIG. 1, except that an air supply unit 4b that supplies air to the third gas channel 3 is used in place of the air supply unit 4a that supplies air to the second gas channel 2, and that the second gas channel 2 and the third gas channel 3 are partially partitioned by a nitrogen permeation membrane 2b that selectively allows nitrogen to permeate therethrough, in place of the oxygen permeation membrane 2a that selectively allows oxygen to permeate therethrough.

Thus, in the ammonia synthesis apparatus 20, nitrogen contained in the air supplied to the third gas channel 3 permeates through the nitrogen permeation membrane 2b, to be supplied to the second gas channel 2, and oxygen contained in the air supplied to the third gas channel 3 is supplied to the third gas channel 3 without permeating through the nitrogen permeation membrane 2b.

In the following, each constituent element of the ammonia synthesis apparatuses 10, 20 according to the first and second embodiments of the invention will be described in greater detail.

The first gas channel 1 may be any desired gas channel that permits gas to flow therethrough.

The metal or metal oxide 1a that reduces water and produces hydrogen is placed in the first gas channel 1. Therefore, when water, in particular, water vapor, is supplied to the first gas channel 1, the water is reduced by the metal or metal oxide 1a, so as to form hydrogen. Namely, hydrogen is produced by reducing water, using oxidation-reduction reaction between metal and metal oxide 1a, or oxidation-reduction reaction between metal oxides 1a having different states of oxidation. For information about metal and metal oxide 1a that can be used for the production of hydrogen, reference may be made to Japanese Patent Application Publication No. 2007-112672 (JP-A-2007-112672), Japanese Patent Application Publication No. 11-322301 (JP-A-11-322301), and Kodama, T., Gokon, N., 2007, "Thermochemical Cycles for High-Temperature Solar Hydrogen Production", Chemical Reviews, 107, 4048-4077.

Examples of the oxidation-reduction reaction between a metal and its metal oxide 1a include reactions as indicated by the following reaction formulae: $M+H_2O \rightarrow M_{2/m}O+H_2$ (hydrogen production), $M_{2/m}O \rightarrow M+1/2 O_2$ (metal reproduction), where M is a metal element, and m is the valence of the metal element M.

The metal M may be selected from, for example, magnesium (M), aluminum (Al), iron (Fe), and zinc (Zn).

Examples of the oxidation-reduction reaction between the metal oxides having different states of oxidation include reactions associated with iron as indicated by the following reaction formulae: $3FeO+H_2O \rightarrow Fe_3O_4+H_2$ (hydrogen production), $Fe_3O_4 \rightarrow 3FeO+1/2 O_2$ (metal-oxide reproduction).

Example of metal oxides that can be used for reactions between metal oxides having different states of oxidation similar to those as indicated above include cobalt oxide, nickel oxide, manganese oxide, and ferrite. For example, cobalt oxide may be subjected to reactions as follows: $3CoO+H_2O \rightarrow Co_3O_4+H_2$ (hydrogen production), $2Co_3O_4 \rightarrow 6CoO+O_2$ (metal-oxide reproduction).

The metal and/or metal oxide 1a used in the thermochemical decomposition process utilizing the oxidation-reduction reaction of the metal and/or metal oxide 1a may be supported in the form of fine powder on a support having, for example, a fin-shaped structure, honeycomb-shaped structure, or a pellet-shaped structure. In this case, sintering of the metal and/or metal oxide 1a used in the above process is curbed or prevented, so that a relatively large surface area can be maintained.

For example, the methods or processes (i)-(iv) as indicated below may be considered as a process for reproducing the metal and/or metal oxide 1a used in the thermochemical decomposition process.

(i) Electrolytic method in which a metal chloride obtained via a reaction of a metal oxide produced as a result of reaction for forming hydrogen, with seawater, undergoes molten salt electrolysis, for reproduction of magnesium, aluminum, zinc, iron, etc., in particular, reproduction of magnesium.

(ii) Thermal reduction process in which the metal oxide produced is heated to a high temperature under a reduced pressure, along with a reductant, such as carbon or silicon, and/or inert gas, such as nitrogen, so as to be recovered in the form of metal vapor, for reproduction of magnesium, aluminum, zinc, iron, etc., in particular, reproduction of magnesium. Since this process requires a relatively large device for reduction, decomposition of water using metal and/or metal oxide and reproduction of the metal oxide that has been used may be carried out at different locations. A process for obtaining magnesium by reproducing magnesium oxide in this manner by this method is referred to as "Pidgeon process".

(iii) Reduction and firing process used for reproduction of iron, in which carbon or carbon monoxide is supplied to the metal oxide produced, so that the metal oxide is directly reduced by heat. The heat used in this process may be obtained by using a light/heat-collection lens, or burning fuel, for example.

(iv) Direct reduction process in which nitrogen is supplied to the metal oxide that has been used while heat, in particular, solar heat, is being applied to the metal oxide, so that the metal oxide that has been used is reduced into a relatively reduced state, for reproduction of the metal oxide, in particular, reproduction of cobalt oxide. In this connection, cobalt oxide that is in a relatively oxidized state can be reduced into cobalt oxide that is in a relatively reduced state by this method, with application of heat of about 1000° C., according to the following formula: $2Co_3O_4 \rightarrow 6CoO+O_2$, as described in Kodama, T., Gokon, N., 2007, "Thermochenical Cycles for High-Temperature Solar Hydrogen Production", Chemical Reviews, 107, 4048-4077.

The second gas channel 2 may be any desired gas channel that is disposed outside the first gas channel 1. In particular, the second gas channel 2 is concentrically disposed outside the first gas channel 1 so as to surround the first gas channel 1. Here, a downstream end portion of the second gas channel 2 is located downstream of a downstream end portion of the first gas channel 1, and an ammonia synthesis catalyst 2c for synthesizing ammonia from hydrogen and nitrogen is disposed in a portion of the second gas channel 2 which is located on the downstream side of the downstream end portion of the first gas channel 1.

The above-mentioned ammonia synthesis catalyst 2c has been explained in many documents. For example, an iron containing catalyst, ruthenium containing catalyst, platinum containing catalyst, nickel containing catalyst, and others, may be used as the ammonia synthesis catalyst 2c. The pressure used for the synthesis of ammonia may be in the range of, for example, 1-30 MPa. Where an iron containing catalyst is used as the ammonia synthesis catalyst 2c, for example, ammonia may be synthesized at a pressure of 10-30 MPa. Where a ruthenium containing catalyst is used as the ammonia synthesis catalyst 2c, ammonia may be synthesized at a pressure of 1-10 MPa.

The third gas channel 3 may be any desired gas channel that is disposed outside the second gas channel 2. In particular, the third gas channel 3 is concentrically disposed outside the second gas channel 2 so as to surround the second gas channel 2.

The second gas channel 2 and the third gas channel 3 are at least partially partitioned by the oxygen permeation membrane 2a that selectively allows oxygen to permeate therethrough, or the nitrogen permeation membrane 2b that selectively allows nitrogen to permeate therethrough, so that oxygen is supplied to the third gas channel 3, and nitrogen is supplied to the second gas channel 2. An oxygen-rich component of the gas supplied to the third gas channel 3 may be discarded, or may be utilized for other purposes.

With the arrangement in which the second gas channel 2 and the third gas channel 3 are at least partially partitioned by the oxygen permeation membrane 2a for selectively allowing oxygen to permeate therethrough, when air is supplied from the air supply unit 4a (which will be described later) to the second gas channel 2, oxygen contained in the air supplied to the second gas channel 2 permeates through the oxygen permeation membrane 2a, to be supplied to the third gas channel 3, while nitrogen contained in the air supplied to the second gas channel 2 keeps flowing through the second gas channel 2 without permeating through the oxygen permeation membrane 2a. Also, with the arrangement in which the second gas channel 2 and the third gas channel 3 are at least partially partitioned by the nitrogen permeation membrane 2b for selectively allowing nitrogen to permeate therethrough, when air is supplied from the air supply unit 4b (which will be described later) to the third gas channel 3, nitrogen contained in the air supplied to the third gas channel 3 permeates through the nitrogen permeation membrane 2b, to be supplied to the second gas channel 2, while oxygen contained in the air supplied to the third gas channel 3 keeps flowing through the third gas channel 3 without permeating through the nitrogen permeation membrane 2b.

The "oxygen permeation membrane 2a" used in the first embodiment is defined as a membrane through which oxygen is more likely to permeate than nitrogen when the membrane contacts with air. Here, the mole ratio ($O_2/N_2$) of the permeation amount of oxygen to that of nitrogen is, for example, 2 or larger, 10 or larger, 50 or larger, 100 or larger, or 1,000 or larger, at operating temperatures.

Many types of oxygen permeation membranes are known which may be used as the oxygen permeation membrane 2a, and reference may be made to, for example, Japanese Patent Application Publication No. 2008-062188 (JP-A-2008-062188). As specific examples of the oxygen permeation membrane 2a, an oxygen permeation membrane 2a formed of a composite oxide having a mixed ionic-electronic conductor, such as $CaTiO_3$, for conduction of oxygen ions and electrons, and an oxygen permeation membrane 2a formed by coating a surface of porous alumina, for example, with a mixed ionic-electronic conductor, such as $CaTiO_3$, for conduction of oxygen ions and electrons may be used. To promote the oxygen separating function of the oxygen permeation membrane 2a, an oxygen dissociation catalyst may be supported on one side of the oxygen permeation membrane 2a to which air is supplied, and an oxygen recombining catalyst (oxidation catalyst) may be supported on the other side of the oxygen permeation membrane 2a. Also, the oxygen permeation membrane 2a thus formed may be used at a temperature of, for example, 800° C.-1000° C.

The "nitrogen permeation membrane 2b" used in the second embodiment is defined as a membrane through which nitrogen is more likely to permeate than oxygen when the membrane contacts with air. Here, the mole ratio ($N_2/O_2$) of the permeation amount of nitrogen to that of oxygen is, for example, 2 or larger, 10 or larger, 50 or larger, 100 or larger, or 1,000 or larger, at operating temperatures.

The air supply unit 4a, 4b may be any portion of the apparatus which supplies air to the second or third gas channel 2, 3. For example, the air supply unit 4a, 4b is in the form of an air inlet through which air is taken in from the outside, or a pump that delivers air into the second or third gas channel 2, 3.

The water supply unit 5 may be any portion of the apparatus which supplies water to the first gas channel 1. For example, the water supply unit 5 has a valve, pump, or the like, for adjusting the amount of water supply.

The water supply unit 5 supplies water to the first gas channel 1 after heating water through heat exchange at the second and/or third gas channel(s) 2, 3. Namely, as shown in FIG. 1 and FIG. 2, water supplied from a water supply unit 5' is heated at a heat exchanger 5a disposed in the third gas channel 3, and then supplied to the first gas channel 1.

In this case, the heat exchange at the second and/or third gas channel(s) 2, 3 may be performed in the vicinity of the ammonia synthesis catalyst 2c, i.e., on the downstream side of the downstream end portion of the first gas channel 1, so as to lower the temperature(s) of hydrogen and/or nitrogen entering the ammonia synthesis catalyst 2c, thus assuring an improved rate of conversion into ammonia. Also, the ammonia synthesis catalyst 2c may be divided into two or more catalyst layers, and the heat exchange at the second and/or third gas channel(s) 2, 3 may be performed between the catalyst layers, so that reaction heat produced upon synthesis of ammonia can be collected, and the temperature at the outlet of the ammonia synthesis catalyst 2c is lowered to, for example, 300° C.-500° C., thus assuring an improved rate of conversion into ammonia.

The heat supply unit 6 may be any portion of the apparatus which supplies heat to at least the first gas channel 1. The heat supply unit 6 may also supply heat to the second and third gas channels 2, 3 as needed. In particular, the heat supplied from the heat supply unit 6 is nuclear-generated heat or solar heat. If solar thermal energy is supplied, carbon dioxide and other gases that cause global warming will not be released. Where the heat supply unit 6 supplies solar heat, the heat supply unit 6 may be in the form of a solar collector or solar collecting system.

Examples of the solar collector include, for example, a parabolic dish type solar collector, a solar tower type solar collector, and a parabolic trough type solar collector.

More specifically, the parabolic dish type solar collector has a dish-shaped reflector that reflects sunlight and concentrates the light at a focal point, and a receiver that receives the concentrated light. The solar collector of this type has a high light-collecting efficiency, and thus provides a high-temperature heat source, but is available at relatively high cost. The solar tower type solar collector has a plurality of heliostats (reflectors) that reflect and concentrate sunlight, and a receiver disposed at the top of a light-receiving tower. The solar tower type solar collector has a high light-collecting efficiency, and thus provides a high-temperature heat source; however, the construction cost for the tower is high, and a highly advanced technology is required for the control of the reflectors. The parabolic trough type solar collector has a trough-type reflector that reflects and concentrates sunlight, and a receiver that receives the concentrated light. The solar collector of this type has a relatively low light-collecting efficiency, and thus provides a low-temperature heat source. In any of the above types of solar collectors, the reflector(s) may be covered with a reflective material, such as aluminum.

The gas produced by the ammonia synthesis apparatus 10, 20 of each of the embodiments generally contains ammonia, hydrogen and nitrogen. Accordingly, the ammonia synthesis apparatus 10, 20 of each embodiment has an ammonia collecting unit that collects ammonia from the produced gas as desired and re-circulates the remainder of the gas. The ammonia collecting unit may be a wet-type ammonia collector that causes ammonia in the produced gas to be absorbed into water, and thus separates ammonia from hydrogen and nitrogen as unreacted components, or may be a liquefying-type ammonia collector that liquefies ammonia in the produced gas, and thus separates ammonia from hydrogen and nitrogen as unreacted components. The hydrogen and nitrogen obtained in the ammonia collecting unit may be returned to certain locations in the ammonia synthesis apparatus 10, 20 of each embodiment. More particularly, the hydrogen and nitrogen may be returned, along with water supplied from the water supply unit, to the ammonia synthesis apparatus 10, 20, or may be returned to the ammonia synthesis apparatus 10, 20 at a location immediately ahead of the ammonia synthesis catalyst 2c, for example.

The process of synthesizing ammonia, using the ammonia synthesis apparatus 10, 20 of each of the embodiments, includes the steps of: supplying water from the water supply unit 5 to the first gas channel 1 so that water reacts with metal or metal oxide and is thus reduced to form hydrogen, supplying air from the air supply unit 4a, 4b to the second or third gas channel 2, 3, so that oxygen is supplied to the third gas channel 3 while nitrogen is supplied to the second gas channel 2, by means of the oxygen permeation membrane 2a or the nitrogen permeation membrane 2b, and supplying the hydrogen produced in the first gas channel 1 and the nitrogen supplied to the second gas channel, to the ammonia synthesis catalyst 2c, so as to synthetically produce ammonia.

A process for reconditioning the ammonia synthesis apparatus 10, 20 of each of the embodiments, namely, a process for renewing metal or metal oxide that has reacted with water for the synthesis of ammonia using the ammonia synthesis apparatus 10, 20 of each embodiment, includes the steps of: stopping supply of water from the water supply unit 5 to the first gas channel 1, supplying air from the air supply unit 4a, 4b to the second or third gas channel 2, 3, so that oxygen is supplied to the third gas channel 3 while nitrogen is supplied to the second gas channel 2, by means of the oxygen permeation membrane 2a or nitrogen permeation membrane 2b, and causing nitrogen supplied to the second gas channel 2 to flow through the first gas channel 1 in the reverse direction, while preventing nitrogen from being discharged from the outlet of the second gas channel 2, while heat is supplied from the heat supply unit 6 to the first gas channel 1, so as to renew the metal or metal oxide 1a that has reacted with water.

The above-described process for reconditioning the ammonia synthesis apparatus of the invention will be described referring to FIG. 3, with regard to an ammonia synthesis apparatus 30 having the same construction as the ammonia synthesis apparatus 10 as shown in FIG. 1.

In the ammonia synthesis apparatus 30 as shown in FIG. 3, supply of water from the water supply unit 5 or 5' to the first gas channel 1 is stopped, and air is supplied from the air supply unit 4a to the second gas channel 2, so that oxygen is supplied to the third gas channel 3 through the oxygen permeation membrane 2a, and nitrogen is supplied to the second gas channel 2. In this condition, nitrogen supplied to the second gas channel 2 is prevented from being discharged from the outlet of the second gas channel 2, for example, by closing a valve provided at the outlet of the second gas channel 2, so that nitrogen supplied to the second gas channel 2 flows through the first gas channel 1 in the reverse direction.

In order to renew the metal or metal oxide 1a that has reacted with water, a higher temperature than that required for production of hydrogen is generally required. In this case, therefore, the amount of air supplied from the air supply unit 4a, 4b to the second or third gas channel 2, 3 is reduced to be smaller than the amount of air supplied when ammonia is synthesized using the ammonia synthesis apparatus 10, 20 of the invention, so that the amount of nitrogen that flows through the first gas channel 1 in the reverse direction can be reduced.

In the present invention, the metal or metal oxide may be selected from the group consisting of iron oxide, cobalt oxide, nickel oxide, manganese oxide, and ferrite.

In the present invention, the heat supply unit may be a solar collector.

In the present invention, the water supply unit may supply water to the first gas channel after heating water through heat exchange at the second gas channel and/or the third gas channel.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An ammonia synthesis apparatus comprising:
   a first gas channel;
   a second gas channel disposed outside the first gas channel;
   a third gas channel disposed outside the second gas channel;
   an air supply unit that supplies air to the second or third gas channel;
   a water supply unit that supplies water to the first gas channel; and
   a heat supply unit that supplies heat to the first gas channel,
   wherein a metal or a metal oxide that reduces water so as to produce hydrogen is placed in the first gas channel;
   wherein a downstream end portion of the second gas channel is located downstream of a downstream end portion of the first gas channel;
   wherein an ammonia synthesis catalyst for synthesizing ammonia from hydrogen and nitrogen is placed in a portion of the second gas channel which is located downstream of the downstream end portion of the first gas channel; and
   wherein the second gas channel and the third gas channel are at least partially partitioned by an oxygen permeation membrane that selectively allows oxygen to permeate therethrough, or a nitrogen permeation membrane that selectively allows nitrogen to permeate therethrough, so that oxygen is supplied to the third gas channel, and nitrogen is supplied to the second gas channel.

2. The ammonia synthesis apparatus according to claim 1, wherein the metal or metal oxide is selected from the group consisting of iron oxide, cobalt oxide, nickel oxide, manganese oxide, and ferrite.

3. The ammonia synthesis apparatus according to claim 1, wherein the metal or metal oxide is supported in the form of fine powder on a support having one of a fin-shaped structure, a honeycomb-shaped structure, and a pellet-shaped structure.

4. The ammonia synthesis apparatus according to claim 1, wherein the heat supply unit is a solar collector.

5. The ammonia synthesis apparatus according to claim 4, wherein the solar collector is selected from a parabolic dish type solar collector, a solar tower type solar collector, and a parabolic trough type solar collector.

6. The ammonia synthesis apparatus according to claim 1, wherein the heat supply unit supplies heat generated from nuclear energy.

7. The ammonia synthesis apparatus according to claim 1, wherein the water supply unit supplies water to the first gas channel after heating the water through heat exchange at the second gas channels and/or the third gas channels.

8. The ammonia synthesis apparatus according to claim 1, wherein:
- the second gas channel is disposed concentrically with the first gas channel so as to surround the first gas channel; and
- the third gas channel is disposed concentrically with the second gas channel so as to surround the second gas channel.

* * * * *